3,405,053
**TWO-STEP STEAM-HEAT TREATED LIGNOCEL-
LULOSE PRODUCT AND PROCESS**
Ronald L. Broadhead, Addison, and William R. Dunlop,
Maywood, Ill. (both c/o The Richardson Company, Melrose Park, Ill. 60160)
No Drawing. Filed Nov. 2, 1964, Ser. No. 408,350
8 Claims. (Cl. 260—17.2)

ABSTRACT OF THE DISCLOSURE

A mixture of lignocellulose and a phenolic agent are subjected to an initial reaction with steam in a confined chamber followed by a reduction of pressure in the chamber to 100 p.s.i. or below and then a second steam treatment under the same conditions as the first steam treatment to produce a lignocellulose derivative having a high curable resin content.

---

The present invention relates to a method of making a new, useful product having a high resinous content from lignocellulose raw materials.

Considerable research effort has been directed to developing useful products from lignocellulose raw materials, such as wood flour, sawdust, wood chips and the like. In general, these efforts have been concerned with attempts to chemically modify the natural lignins, cellulose or hemicellulose components of the raw material whereby the modified material has improved properties and is more useful in such applications as molding compositions, synthetic board manufacture, etc.

Various techniques have been developed by the prior art for treating or processing lignocellulose materials to improve their properties and extend their utility. One such technique involves introducing a charge of the raw material into a vessel, together with a large volume of water, subjecting the mass to elevated temperatures and subsequently "exploding" the cooked mass from the vessel under high pressure. Various types of catalysts or modifying agents are frequently use, particularly acids or bases.

Another technique of recent origin involves a dry type of treatment, wherein the raw material is subjected to elevated temperatures in a closed vessel or autoclave in the substantial absence of larger quantities of moisture, with or without the addition of catalysts or modifying agents. A number of the patents issued to Glab, such as 2,864,715 and 2,872,330, are exemplary of the latter technique.

While many of the prior art products have resulted in commercial applications, they have not always afforded certain desired properties or characteristics. In particular, even though the chemically modified lignocellulose materials of the prior art have been improved in resinous content, it is generally necessary to add additional resin when using such modified materials in molding applications. Further, additional resin and other agents may frequently be required as additives to improve the flow characteristics of the chemically modified product.

Accordingly, it is one of the principal objects of this invention to provide a new process for preparing improved products from lignocellulose raw materials.

Another object is to provide a process for making lignocellulose derivatives containing a larger resinous content than has been heretofore attainable.

A further object is the provision of products of the foregoing type having enhanced flow under molding pressures.

Basically, the process of the present invention comprises subjecting raw lignocellulose, such as sawdust, to the action of two sequential, substantially dry steam treatments in a closed reaction chamber in the presence of a phenolic agent, such as cresol. It is an important feature of the invention that the reaction be conducted in two steps wherein the raw mixture is initially subjected to steam for a predetermined period and the pressure in the reaction chamber released, followed by a second steam treatment for a predetermined period.

The basic reasons for the improved results obtained, as hereinafter more specifically demonstrated, are not completely understood at the present time. However, it is believed that the intermediate reduction of pressure between steam treatments involves an exploding phenomenon whereby the lignocellulose and phenolic agent are more intimately mixed affording enhanced opportunity for chemical reaction as well as contact of the partially reacted mass with steam during the second step. The only moisture present is that which is naturally within the lignocellulose or arises through condensation of steam.

Various types of naturally occurring finely divided lignocellulose materials may be used, particularly wood chips, sawdust, or analogous wood waste obtained from ponderosa pine, white pine, southern pine, Douglas fir, western red cedar, spruce and other soft woods. Additionally, hard wood derivatives may also be used such as those obtained from birch, oak, maple, ash and the like. In general, the lignocellulose should have a particle size of no more than about 8 mesh with a preferred range of between about 50–100 mesh.

The phenolic agent contemplated as a component of the reaction mass may be phenol, a cresol, a xylenol or mixtures thereof, preferably employed within the range of between approximately 5–15 percent based on the weight of the lignocellulose charge. The foregoing range of phenolic agent contemplates sufficient phenolic agent to obtain maximum reaction with the normal quantities of lignins and hemicellulose found in most woody products to produce curable resin in accordance with the present theory of the chemical reaction believed to be involved. However, if appreciably more than fifteen percent phenolic agent is used for the average woody lignocellulose raw product, free unreacted agent will usually be found in the end product. Conversely, the phenolic agent should be used in sufficient quantities to insure formation of all curable resin deemed possible for a given lignocellulose raw material.

The lignocellulose and phenolic reagent are initially mixed together and then placed into the reaction chamber, although mixing of the two components within the reaction vessel may also be performed where practical. Substantially dry steam at a gauge pressure of 250–500 p.s.i., preferably 300–400 p.s.i., is then introduced into the chamber for an initial period of between 1–10 minutes and, preferably 2–5 minutes. These pressures represent temperatures of the steam within the range of about 400° F. to 470° F. and 415° F. to 445° F., respectively. After the initial treatment with steam the pressure within the chamber is released to a point where it is below 100 p.s.i., and preferably, about atmospheric pressure. The charge is then immediately subjected to a second steam treatment for a period of from 1–10 minutes and, preferably, 2–5 minutes wherein the steam is introduced within the same temperature range. In general, the time of steam contact is inversely proportional to the temperature of the steam used. The final product is, normally, a dark brown powdery material and has a density of about 0.8 to 1.2. However, the density will depend upon process conditions and the starting material.

The foregoing process results in a marked increase in the curable resin content of the lignocellulose as compared to curable resin content of the raw lignocellulose or other chemically modified lignocellulose products as may be obtained from prior art processes.

The total curable resin present in the lignocellulose is measured by means of solvent extraction using three different solvents in sequence, namely methanol, dioxane and then dimethyl formamide, after initially removing water and toluene soluble components. These latter components comprise, primarily, sugars, fats and natural wood resins, respectively.

The following examples further illustrate the principles of the invention wherein the lignocellulose used was 80 mesh ponderosa pine wood flour and the xylenol was Cresylic Acid No. 5 (Pitt Consol) comprising, primarily, by weight:

3,5 xylenols _____ 45–50
3,4 xylenols _____ 20–25
Ethyl phenols _____ 20–25

|  | Reaction conditions | | | | Product analysis | | | |
|---|---|---|---|---|---|---|---|---|
| Example No. | Reagent | Percent wt. reagent | Pressure (p.s.i.) | Cook time (min.) | Percent moisture | Percent water solubles | Percent total curable resin | Percent residual lignin ($H_2SO_4$) method |
| 1 | | | | | 5.2 | 5.41 | *2.3 | 26.05 |
| 2 | | | 320 | 6 | 3.1 | 15.3 | 16.8 | 23.5 |
| 3 | | | 320 | 2 and 4 | 3.0 | 13.2 | 16.9 | 23.5 |
| 4 | Xylenol | 9 | 320 | 6 | 5.8 | 17.4 | 16.9 | 11.7 |
| 5 | do | 9 | 320 | 2 and 4 | 4.8 | 15.8 | 30.5 | 8.7 |
| 6 | do | 17 | 320 | 6 | 5.2 | 16.8 | 18.1 | 9.5 |
| 7 | do | 17 | 320 | 2 and 4 | 5.6 | 14.8 | 31.1 | 10.7 |

*These were extractable resins but not necessarily curable.

Example 1 designates the normal properties of wood flour in its natural state and not mixed with phenolic agent or subjected to a steam treatment. Examples 2 and 3 indicate the results of treating wood flour in a one-step and two-step process, respectively, but without the presence of a phenolic agent. In both examples it is to be noted that the curable resin obtained from steam treatment alone comprises slightly less than seventeen percent and the residual lignin is relatively high at 23.5 percent. Correspondingly, Example 4 indicates the result of mixing a phenolic agent with the lignocellulose but subjecting the mixture to a single step steam treatment. Here again, the curable resin is within the sixteen percent range, although the residual lignin has decreased somewhat. Increasing the amount of cresol in a single step steam treatment does not materially affect the curable resin result as is evidenced by a comparison of the results of Example 6 with Example 4.

The synergistic effect of the present invention, using a phenolic agent in combination with a two-step steam treatment, is readily apparent in Examples 5 and 7 wherein the curable resin obtained in the final product is in the thirty percent area. It is also of interest to note that the resulting water soluble content of the two-step steam treatment in combination with adding a phenolic agent is the same as or slightly less than the other processes of steam alone or a single steam treatment using a phenolic agent additive. In general, it can be expected that products will be obtained from the teachings of this invention having a minimum of about twenty percent curable resin, which comprises an appreciable improvement over other known processes directed to a similar objective. Correspondingly, the residual lignin is generally reduced to under twelve percent.

The product containing the high curable resin content acts in the nature of a novolak type resin and may be cured to a hard, infusible state under heat and pressure by addition of a methylene donating agent such as paraformaldehyde hexamethylene tetraamine. Further, the chemically modified lignocellulose product may be mixed as the principal binder with a variety of inert fillers, such as wood flour, sawdust and the like, and molded in the same manner as general purpose phenolic molding compounds. Such compositions may contain from about three percent up to ninety percent by weight of the chemically modified lignocellulose product with which the present invention is concerned. The high resin content acts as binder and also serves to improve the flow characteristics of the product, eliminating the need for adding additional resin or similar agents customarily incorporated to improve flow in molding operations. Molding conditions will, of course, depend upon the characteristics desired in an end product, such as density, hardness and the like. Pressures of from about 500 to 3 or 4 thousand pounds per square inch may be used in combination with temperatures of the order of 200° F. to 500° F.

Of special interest is the fact that products obtained from the process of the present invention will enable the manufacture of particle or hard board at a substantially reduced cost, eliminating to a large extent the need for the more expensive addition of phenolic type resins. Such products have been found to have improved impact resistance and enhanced flexual strength. The board products may be made from a composition comprising from about 3–10 percent by weight of the resinous product of this invention with the remainder comprising an inert filler such as sawdust, wood chips or the like, with minor amounts of the customary components such as wax and metal oxides, for example, magnesium oxide.

We claim:

1. A method for making a chemically modified lignocellulose containing a high content of curable resin which comprises subjecting a mixture of lignocellulose and a phenolic agent from the class consisting of phenol, cresols and xylenols in a closed chamber to the action of steam at a temperature of between about 400° F. to 470° F. initially for a period of 1–10 minutes, reducing the pressure in said chamber to below 100 p.s.i., and then reintroducing into said chamber steam at a temperature of between about 400° F. to 470° F. for a period of 1 to 10 minutes.

2. A method for making a chemically modified lignocellulose as described in claim 1 wherein the steam used is at a temperature of between about 415° F. to 445° F.

3. A method as described in claim 2 wherein the length of each of the periods during which the lignocellulose mass is contacted with steam is from about 2–5 minutes.

4. A method as described in claim 1 wherein the phenolic agent comprises between approximately 5–15 percent by weight based on the weight of the lignocellulose.

5. A chemically modified lignocellulose product derived from the method of claim 1.

6. A chemically modified lignocellulose product as defined in claim 5 having a maximum residual lignin content of about 12 percent.

7. A hard molded product formed by molding under heat and pressure a composition containing a product as described in claim 5 and a curing agent for said resin.

8. A hard molded product as described in claim 5 wherein said composition contains as a filler a non-chemically modified lignocellulose.

References Cited

UNITED STATES PATENTS 2,221,282   11/1940   Champer et al. _____ 260—17.5
2,501,665   3/1950    Evans et al. _____ 260—17.5
3,241,991   3/1966    Glab _____ 260—17.2

WILLIAM H. SHORT, *Primary Examiner.*

E. M. WOODBERRY, *Assistant Examiner.*